(12) United States Patent
Tapp

(10) Patent No.: US 7,551,697 B1
(45) Date of Patent: Jun. 23, 2009

(54) REDUCED COMPLEXITY SOFT-OUTPUT NONCOHERENT CONTINUOUS PHASE DEMODULATOR SYSTEMS

(75) Inventor: Thomas L. Tapp, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 568 days.

(21) Appl. No.: 10/957,084

(22) Filed: Oct. 1, 2004

(51) Int. Cl.
*H04L 27/06* (2006.01)

(52) U.S. Cl. .................................... 375/343

(58) Field of Classification Search ................ 375/150, 375/260, 340, 341, 342, 343, 355, 365, 316, 375/130, 142, 147, 140
See application file for complete search history.

(56) References Cited

U.S. PATENT DOCUMENTS

| | | | |
|---|---|---|---|
| 6,298,463 B1 | 10/2001 | Bingeman et al. | |
| 6,304,991 B1 | 10/2001 | Rowitch et al. | |
| 6,351,832 B1 | 2/2002 | Wei | |
| 6,427,214 B1 | 7/2002 | Li et al. | |
| 6,484,283 B2 | 11/2002 | Stephen et al. | |
| 6,594,792 B1 | 7/2003 | Hladik et al. | |
| 6,637,000 B2 | 10/2003 | Rowitch et al. | |
| 6,728,927 B2 | 4/2004 | Crozier | |
| 6,999,533 B2 * | 2/2006 | Murthy et al. | 375/343 |
| 7,065,157 B2 * | 6/2006 | O'Shea | 375/305 |

OTHER PUBLICATIONS

Robert E. Van Dyck (Noncoherent Continuous Phase Frequency-Shift Keying with Trellis-Coded Modulation, pp. 1508-1512, IEEE 1997.*

Ivanovs et al., "Continuous Phase Modulation (CPM) advantage compare with OQPSK (Offset Quadrant Phase Shift Key)", available at www.pdffactory.com, undated, (pp. 27-30).

Lampe et al., "Noncoherent Coded Continuous Phase Modulation", undated, (5 pgs).

Lampe et al., "Noncoherent Continuous-Phase Modulation for DS-CDMA", undated, (5 pgs).

Narayanan et al., "Performance of Trellis-Coded CPM with Iterative Demodulation and Decoding", *IEEE Transactions on Communications*, vol. 49, No. 4, Apr. 2001, (pp. 676-687).

Sadjadpour et al., "Interleaver design for short block length Turbo codes", undated, (pp. 1-4).

Simon et al., "Maximum-Likelihood Block Detection of Noncoherent Continuous Phase Modulation", *IEEE Transactions on Communications*, vol. 41, No. 1, Jan. 1993, (pp. 90-98).

Svensson et al., "Constrained Envelope Continuous Phase Modulation", undated, (5 pgs.).

(Continued)

*Primary Examiner*—Tesfaldet Bocure

(57) ABSTRACT

A method and system of demodulating a received transmission is disclosed. The method comprises disassembling a symbol sequence into a before sequence, a current symbol, and an after sequence. The method also comprises calculating correlations for all possible before sequences and determining the largest correlations for the before sequences, and placing into a first group. Further, the method comprises calculating correlations for all possible after sequences and determining the largest correlations for the after sequences, and placing into a second group. Further still, the method comprises piecing together the sequences of the first group, the second group, and the current symbol, to form a third group. Yet further still, the method comprises calculating the correlations for the third group and determining the largest correlation of the third group.

20 Claims, 4 Drawing Sheets

OTHER PUBLICATIONS

Tapp et al., "Turbo-Detected Coded Continuous-Phase Modulation for Military UHF Satellite Communications", *IEEE*, 2002, (pp. 148-151).

Tapp et al., "Turbo Detection of Coded Continuous-Phase Modulation", IEEE, 1999, (pp. 534-537).

De Veciana et al., "Neural Net-Based Continuous Phase Modulation Receivers", *IEEE Transactions on Communications*, vol. 40, No. 8, Aug. 1992, (pp. 1396-1408).

U.S. Patent Application titled "Diversity Code Combining Scheme for Turbo Coded Systems", filed Oct. 1, 2004, (12 pgs., 3 pgs. of drawings, (15 total pgs.)).

U.S. Patent Application titled "Burst Transmission Using a Spanning Interleaver for Serially Concatenated Continuous Phase Modulation Systems", filed Oct. 1, 2004, (12 pgs., 2 pgs. of drawings, (14 total pgs.)).

* cited by examiner

Demodulator

FIG. 4

US 7,551,697 B1

REDUCED COMPLEXITY SOFT-OUTPUT NONCOHERENT CONTINUOUS PHASE DEMODULATOR SYSTEMS

BACKGROUND

The present invention relates generally to processes that demodulate received transmissions. More specifically, the invention relates to a system and method of demodulation which requires reduced complexity over conventional systems.

Conventionally, data communications systems, either voice or non-voice, make use of signal diversity or redundancy when transmitting information to provide an improvement in performance without comprising certain other aspects of the data transmissions system. Two conventional techniques which are used that add time diversity are known as interleaving and forward-error correcting (FEC) coding.

When using FEC coding, the demodulator often needs to provide a soft decision that approximates the probability or the logarithm of the probability that a given symbol or bit was transmitted. This is especially important when the receiver employs iterative decoding and demodulation.

In certain cases, it is advantageous that the receiver not be required to estimate the phase of the received carrier. In such a case, the demodulator is designed subject to the constraint that the phase is unknown. Such demodulators are said to be non-coherent.

In certain situations it may be desirable to demodulate received signals in a less complex manner. Accordingly, there is a need for a system and method in which a received symbol sequence is broken up into subsequences for demodulation.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

What is provided is a method of demodulating a received transmission. The method comprises breaking a symbol sequence into more than one symbol subsequence. The method also comprises calculating sets of correlations for the subsequences based on possible phase transitions. Further, the method comprises determining a top group of correlations from each set. Further still, the method comprises assembling all of the phase transitions in a final group for all of the possible combinations of transitions from the top group. Yet further still, the method comprises calculating correlations for each of the transition sequences of the final group. Yet still further, the method comprises determining the largest correlation.

What is also provided is a method of demodulating a received transmission. The method comprises disassembling a symbol sequence into a before sequence, a current symbol, and an after sequence. The method also comprises calculating correlations for all possible before sequences and determining the largest correlations for the before sequences and placing into a first group. Further, the method comprises calculating correlations for all possible after sequences and determining the largest correlations for the after sequences and placing into a second group. Further still, the method comprises piecing together the sequences of the first group, the second group, and the current symbol, to form a third group. Yet further still, the method comprises calculating the correlations for the third group and determining the largest correlations of the third group for each possible symbol, as an approximation to the log likelihood of that symbol Further, what is provided is a system of demodulating a received transmission. The system comprises a means for disassembling symbol sequences into a before sequence, a current symbol, and an after sequence. This system also comprises a means for calculating correlations for all possible before sequences and a means for determining the largest correlations for the before sequences and placing into a first group. Further, the system comprises a means for calculating correlations for all possible after sequences and a means for determining the largest correlations for the after sequences and placing into a second group. Further still, the system comprises a means for piecing together the sequences of the first group, the second group, and the current symbol, to form a third group. Yet further still, the system comprises a means for calculating the correlations for the third group and a means for determining the largest correlations of the third group for each possible symbol, as an approximation to the log likelihood of that symbol.

Alternative examples and other exemplary embodiments may also be provided which relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which:

FIG. 4 is block diagram of a demodulator for demodulating a received transmission, according to various exemplary embodiments.

DETAILED DESCRIPTION OF THE PREFERRED AND EXEMPLARY EMBODIMENTS

Figure 1:
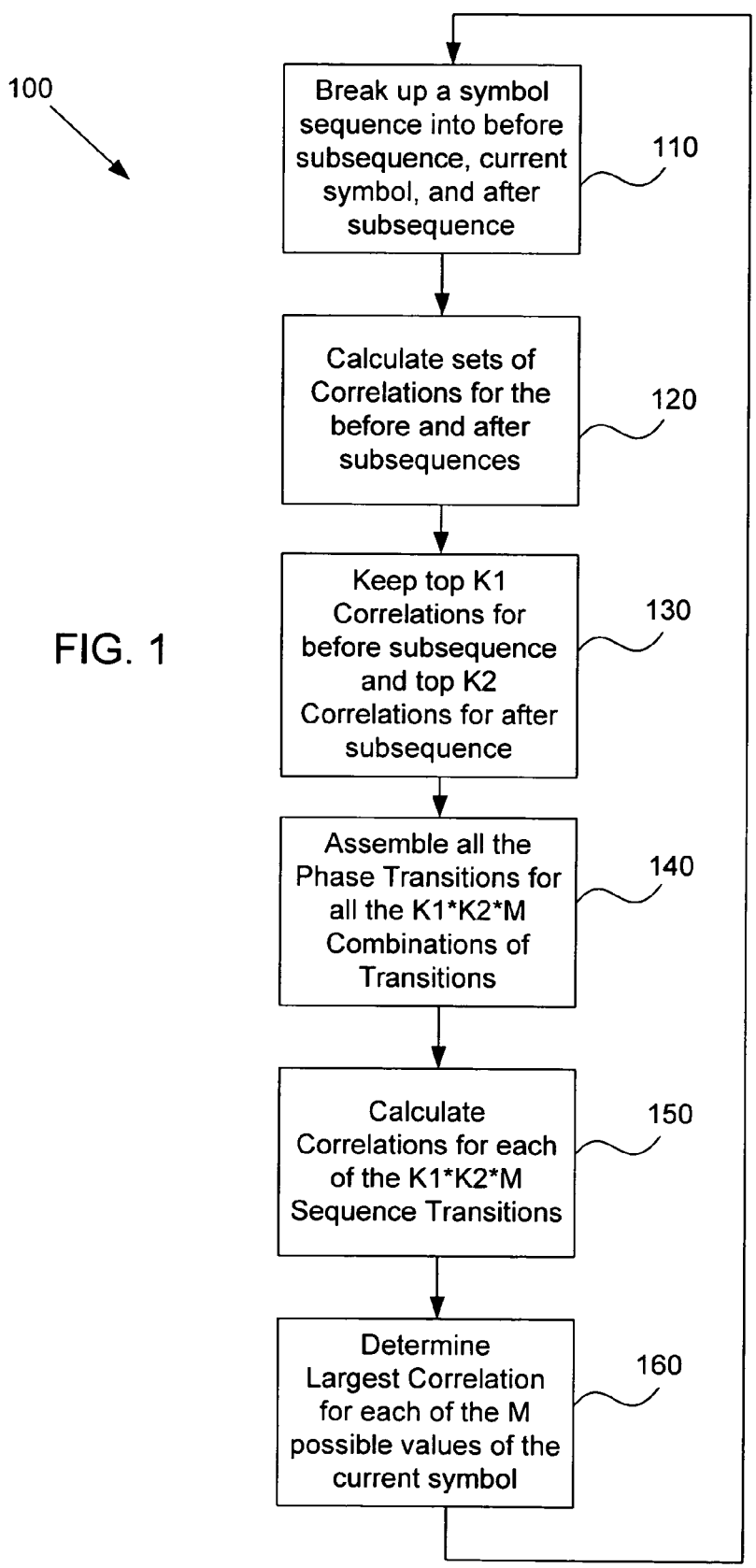
FIG. 1 is an exemplary process diagram of a demodulation process.
Figure 2:
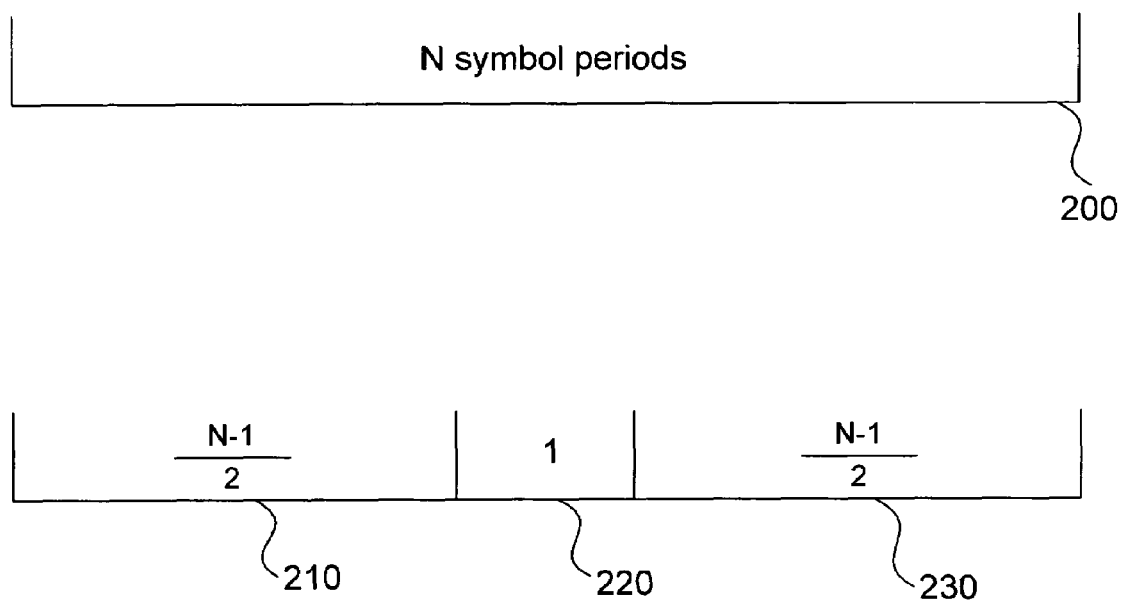
FIG. 2 is an exemplary diagram of a symbol sequence being broken into subsequences.

Before describing in detail the particular improved system and method, it should be observed that the invention includes but is not limited to a novel structural combination of conventional data/signal processing components and communication circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure the structural details which will be readily apparent in the art, having the benefit of the description herein. Further, the invention is not limited to the particular embodiments depicted in the exemplary diagrams, but should be construed in accordance with the language in the claims.

One approach to noncoherent soft-output CPM demodulators is based on N-symbol correlations. Basically, one computes all $M^N$ correlations for the N symbols surrounding the one for which the soft-output metric is being computed (denoted the "current symbol"), for M-ary modulation (in this example, M=8). That is, one correlates the received waveform against all $M^N$ possible hypothesized sequences. It should be noted that the correlations are computed coherently over the N symbols. One then converts the correlation magnitudes (or square magnitudes) to (approximate) log likelihood values. Finally, for each possible value of the current symbol, one sums the likelihood values for all sequences for which current symbol has that particular value. That is, there are M of these summations. However, since we are usually operating in the log domain, this summation of likelihoods corresponds to a max or max* operation over the log likelihoods. The outputs of this operation are our soft-output symbol log likelihoods.

Figure 4:
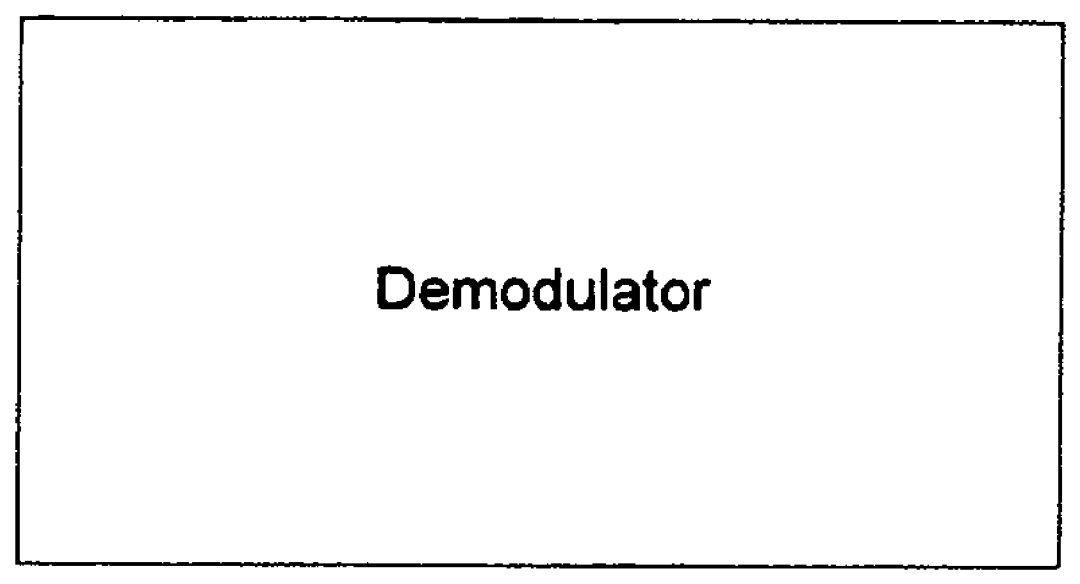

There are some issues with this approach, notably the complexity. Simulation results show that moderately reasonable performance requires that N>=5. Thus for each symbol, $8^5$ (=32 k) correlations are required, which may be problematic or impossible in real-time. The exemplary demodulator in accordance with the invention relies on this general idea, but is significantly simplified. FIG. 4 is block diagram of an exemplary demodulator.

Approximation to Nonlinearities

The nonlinearities involved in the max* and the conversion from correlation to log likelihood work relatively well with simple approximations. Recall that the max*$(x,y)=\ln(e^x+e^y)=$ max$(x,y)+\ln(1+e^{|x-y|})$. This is, it is the maximum plus a correction term that can be stored in a lookup table. In accordance with an exemplary embodiment just the max may be used, ignoring the correction term. (This may also be the case in the decoder.) In an exemplary the coherent demodulator (and decoder) a rather precise (and expensive) approximation may be used. Alternatively, some middle ground may be appropriate. As a first approximation, a simple maximum may work well.

Another nonlinearity can be seen in the conversion from the complex correlation to a log likelihood value. The log likelihood can be computed as $F+\ln I_0(2E/N_0|\beta|)$, where $\beta$ is the sequence correlation, F is a constant, and $I_0$ is the modified zero-th order Bessel function of the first kind. A first approximation chosen for simplicity, is simply $|\beta|^2$, the magnitude-squared of the correlation other approximations may also be applied.

Computation of Sequence Correlations

Figure 3:
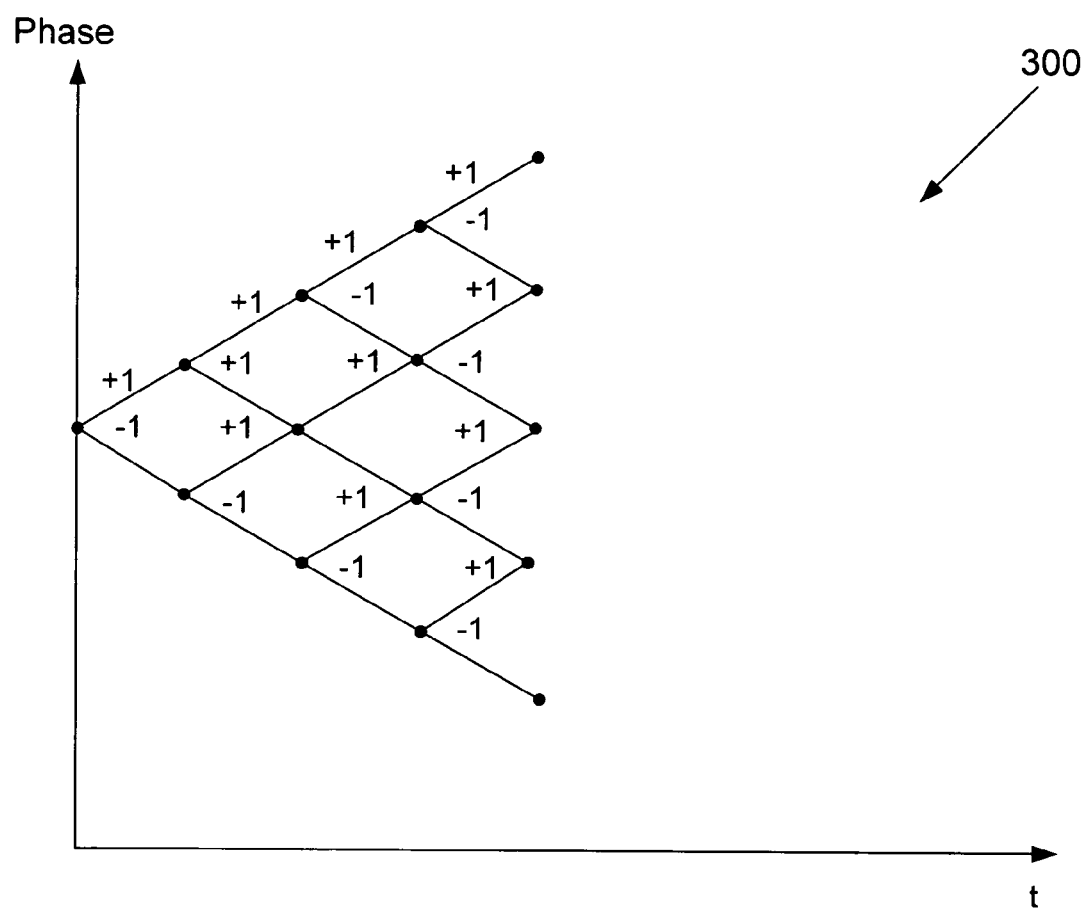
FIG. 3 is an exemplary phase tree diagram.

The sequence correlations are computed by first computing symbols correlations, referenced to a fixed, yet arbitrary, starting phase (see FIG. 3 depicting possible phase transitions over time (t) for binary modulation (M=2)). These symbol correlations are then rotated as necessary and summed to generate a coherent correlation over the N symbols. It may be assumed that the phase is fixed over N symbols, yet its value is unknown relative to the phase at the transmitter. Frequency errors will degrade this assumption.

Data are received at an unknown phase. At the receiver, some phase is arbitrarily assigned the value 0. For M-ary CPFSK, we correlate the received sequence against the M possible hypothesized symbols are correlated all starting at our receiver reference phase of zero. Thus for each symbol, M complex correlations are generated. This is done for each symbol. Thus for each symbol (with time index k), and each value of that symbol i, generate $$C_k^i = \int_{kT}^{(k+1)T} r^*(t)s_i(t)\,dt = \int_{kT}^{(k+1)T} r^*(t)\exp(j\pi h\alpha_i(t-kT))\,dt.$$

The integral will be replaced with a sum over the samples in one symbol interval. r(t) is the received waveform, and $s_i(t)$ is the noiseless sequence we are comparing it to, corresponding to an input value i. For CPFSK, we get the expression on the right, with $j=\sqrt{-1}$, h is the modulation index, and $\alpha_i$ is the phase slope corresponding to input symbol i, $\alpha_i \in \{\pm 1, \pm 3, K\}$.

The next step is to piece these symbol correlations together to get a sequence correlation. To maintain phase continuity at the modulator, each symbol starts at the ending phase of the previous symbol. At the receiver we must do the same thing. This is accomplished by rotating the symbol correlations before adding them. The new phase is simply the old phase plus $\pi h\alpha$, mod $2\pi$. This may be implemented with a lookup table. When the modulation index h is $1/h_{den}$, there are $2*h_{den}$ possible starting phases. For an exemplary case, $h_{den}=8$. The complex values for these rotations may also be stored in a look-up table. If $\psi_k^I$ denotes the phase after symbol k, for sequence I, then, the three symbol correlation, for example, is $$C_k^I = C_k^{i_0} e^{j\psi_k^I} C_{k+1}^{i_1} e^{j\psi_{k-1}^I} C_{k+2}^{i_2}.$$

Here the complex exponential terms may be stored in a look-up table, and they can take on only 16 possible (complex) values.

This may be somewhat more complicated with partial-response pulse shaping but is equally as applicable.

Simplified Computation of Sequence Correlations

The simplified approach relies on only correlating over the most likely sequences. Consider an N symbol correlation 200, wherein in an exemplary embodiment N=7, consisting of three symbols a before 210 an after 230; and the current symbol 220. In other words the symbol sequence is broken into subsequences before and after the current symbol 220 (step 110 FIG. 1). We first do a correlation over all $M^3$ (in this example $8^3$=512) possible 3-symbol sequences 210 prior to the current symbol 220. We then compute the magnitude-squared of these sequences (adding any apriori likelihoods (step 110, FIG. 1)), and keep only those K correlations with the largest magnitude-squared. We do the exact same procedure for the 3-symbol sequences after the current symbol (steps 120 and 130 FIG. 1). We then piece these correlations together with the correlations corresponding to all possible transitions of the current symbol (step 140, FIG. 1). A value of K=8 may be applicable. Thus we have $M^3$ correlations prior to current symbol, $M^3$ correlations after the current symbol, and $K^2 M$ correlations involving the current symbol. For both pre- and post-correlations, the K best magnitude-squares must be found (steps 150 and 160, FIG. 1).

Code Examples

Code examples of the above may be found in the Appendix. First, modulation tables are initialized, which are used in both the modulator and the demodulator. The tables assume eight samples per symbol. The state_trans table stores the terminating phase, as a function of start phase and input symbol. CPM_L is 1 for CPFSK, Hden is 8 (for modulation index ⅛), and CPMLEVELS is 8.

While the detailed drawings, specific examples, and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

---

APPENDIX

We first start by initializing some modulation tables, which are used in both the modulator and the demodulator.
```
void initialize_mod_tables ( ) {
#if CPM_L == 1
    extern dcomplex mod_table8[8][Hden*2][CPMLEVELS];
    extern int state_trans[Hden*2][CPMLEVELS];
    extern int state_trans_1[Hden*2][CPMLEVELS];
#endif
    extern int mod_tables_initialized;
#if CPMLEVELS==8
    extern int cpmmap_sym[2][2][2];    /* maps bit to cpm symbol  */
#endif
    extern int bitmap[CPM_BITSPERSYM][CPMLEVELS];
    double phase;
    int sym, sym1, sym0;
    int samp;
    double t;
    double g8[8][CPM_L];
    int prevphase, nextphase;
    int cpm_alpha;
#if CPMLEVELS==8
    for (sym1 = 0; sym1 < CPMLEVELS; sym1++) {
        cpmmap_sym [bitmap[0][sym1]] [bitmap[1][sym1]]
            [bitmap[2][sym1]] = sym1;
    }
#endif
    /* sps = 8 */
    for (sym = 0; sym < CPM_L; sym++) {
        for (samp = 0; samp < 8; samp++) {
            t = sym + (samp+0.5)/8;
            g8[samp][sym] = (0.5/CPM_L) * t;
        }
    }
#if (CPM_L == 1)
    for (prevphase = 0; prevphase < 2*Hden; prevphase++) {
        for (sym0 = 0; sym0 < CPMLEVELS; sym0++) {
            cpm_alpha = 2*sym0 – CPMLEVELS + 1;
            nextphase = prevphase + cpm_alpha;
            while (nextphase < 0) {
               nextphase += 2*Hden;
            }
            nextphase = nextphase % (2*Hden);
            state_trans[prevphase][sym0] = nextphase;
                state_trans_1[nextphase][sym0] = prevphase;
            /* sps = 8 */
            for (samp = 0; samp < 8; samp++) {
                phase = prevphase;
                phase += cpm_alpha * 2 * g8[samp][0];
                mod_table8[samp][prevphase][sym0].r = cos
                    (PI*CPM_H*phase);
                mod_table8[samp][prevphase][sym0].i =
                    sin(PI*CPM_H*phase);
            }
        }
    }
#endif
    mod_tables_initialized = 1;
}
/****************************************************/
/****************************************************/
```

-continued

APPENDIX

We also need to compute and store the rotations needed to piece together the symbol correlations.
```
/****************************************************/
/****************************************************/
void initialize_rotations ( ) {
    extern dcomplex rotations[Hden*2];
    extern int rotations_initialized;
    int i;
    double ph;
    rotations[0].r = 1.0;
    rotations[0].i = 0.0;
    for (i = 1; i < Hden*2; i++) {
        ph = i * PI / Hden;
        rotations[i].r = cos(ph);
        rotations[i].i = sin(ph);
    }
    rotations_initialized = 1;
}
/****************************************************/
/****************************************************/
```
The symbol correlations can thus be computed, with inputs $in$, the input samples; $sps$, the number of samples per symbol; and output $corr\_out$, the computed correlations.
```
/****************************************************/
/****************************************************/
void mod_correlators_sym_sps (dcomplex *in,
                              int sps,
                              dcomplex *corr_out)
{
/* computes r*(t) x(t), where r(t) is rcvd, x(t) is hypothesized, at 0 ph */
#if CPM_L == 1
    extern dcomplex mod_table8[8][Hden*2][CPMLEVELS];
#endif
    dcomplex (*mod_table)[Hden*2][CPMLEVELS];
    dcomplex result;
    int i, j;
    if (sps == 8) {
        mod_table = mod_table8;
    } else {
        printf("error in mod_correlators_sym_sps in %s, sps must be 8\n",
__FILE__);
        abort( );
    }
    for (i = 0; i < CPMLEVELS; i++) {
        corr_out[i].r = corr_out[i].i = 0.0;
    }
    for (i = 0; i < CPMLEVELS; i++) {
        for (j = 0; j < sps; j++) {
            Cpluseq_aconj_times_b (&(corr_out[i]), in[j],
                mod_table[j][0][i]);
        }
    }
    for (i = 0; i < CPMLEVELS; i++) {
        corr_out[i].r /= sps;
        corr_out[i].i /= sps;
    }
}
/****************************************************/
/****************************************************/
```
This relies on a function to accumulate complex products:
```
/****************************************************/
/****************************************************/
static void Cpluseq_aconj_times_b (dcomplex *c, dcomplex a, dcomplex b)
    /* complex c += conj (a) * b */
{
    (*c).r += (a.r * b.r) + (a.i * b.i);
    (*c).i += (a.r * b.i) – (a.i * b.r);
}
/****************************************************/
/****************************************************/
```
Finally, there is another function to loop over all the symbols in a block:
```
/****************************************************/
/****************************************************/
void mod_correlators_sps (dcomplex *in,
                          long num_syms,
```

-continued

APPENDIX

```
                      int sps,
                      dcomplex corr_out[ ][CPMLEVELS])
{
  long i;
  for (i = 0; i < num_syms; i++) {
    mod_correlators_sym_sps (in + i*sps, sps, corr_out[i]);
  }
}
/*************************************************************/
/*************************************************************/
Now that we have these symbol correlations, we need to put them
together, using all of our simplifications.
/*************************************************************/
/*************************************************************/
#define KEEP_MAX 8
#define CORRS_START (CPMLEVELS*CPMLEVELS*CPMLEVELS)
static void demod1s2_sym_N33 (dcomplex
sym_corrs[ ][CPMLEVELS],
                      int corr_offset,
                      double scale, /* set to sqrt(2*EsNo) */
                      double llr_out[CPMLEVELS],
                      double sym_apr[ ][CPMLEVELS])
{
  /* corr_offset is ofset into sym_corrs of current symbol */
  /* make sure there are enough symbols on either side */
  extern dcomplex rotations [Hden*2];
  extern int state_trans[Hden*2][CPMLEVELS];
  dcomplex pcorr;
  double pathapr;
  double patharg;
  int prev_sym2, prev_sym1, prev_sym0;
  int curr_sym, post_sym0, post_sym1, post_sym2;
  int phm2, phm1, ph0, php1, php2, php3;  /* phases, at time plus or
  minus */
  /* time 0 corresponds to start of current symbol */
  double sym11[CPMLEVELS];
  dcomplex pcorr_big[CORRS_START];
  double ap_big[CORRS_START];
  double p1_big[CORRS_START];
  int ph_big[CORRS_START]; /* possible to eliminate */
  dcomplex pcorr_pre[KEEP_MAX];
  double ap_pre(KEEP_MAX];
  int ph_pre[KEEP_MAX];
  dcomplex pcorr_post[KEEP_MAX];
  double ap_post[KEEP_MAX];
  int path_idx;
  int bestpath;
  int prepath, postpath;
  int i;
  for (curr_sym = 0; curr_sym < CPMLEVELS; curr_sym++) {
    sym11[curr_sym] = -BIG_VAL;
  }
  /* CORRELATIONS FOR PRECEDING THREE SYMBOLS */
  for (prev_sym2 = 0; prev_sym2 < CPMLEVELS; prev_sym2++) {
    phm2 = state_trans[0][prev_sym2];
  for (prev_sym1 = 0; prev_sym1 < CPMLEVELS; prev_sym1++) {
    phm1 = state_trans[phm2][prev_sym1];
  for (prev_sym0 = 0; prev_sym0 < CPMLEVELS; prev_sym0++) {
    ph0 = state_trans[phm1][prev_sym0];
    path_idx = prev_sym2*CPMLEVELS*CPMLEVELS +
    prev_sym1*CPMLEVELS + prev_sym0;
    pcorr = sym_corrs[corr_offset-3][prev_sym2];
    Cpluseq_a_times_b (&pcorr,
                      sym_corrs[corr_offset-2][prev_sym1],
                      rotations[phm2] );
    Cpluseq_a_times_b (&pcorr,
                      sym_corrs[corr_offset-1][prev_sym0],
                      rotations[phm1] );
    /* compute apriori's for the sequence */
    pathapr = sym_apr[corr_offset-3][prev_sym2];
    pathapr += sym_apr[corr_offset-2][prev_sym1];
    pathapr += sym_apr[corr_offset-1][prev_sym0];
    /* store all correlations, terminating phases, and apriori's in a big
table */
    pcorr_big[path_idx] = pcorr;
    ph_big[path_idx] = ph0;
    ap_big[path_idx] = pathapr;
    /* compute and store (approximated) path likelihoods */
    p1_big[path_idx] = scale * Cabs2(pcorr);
    p1_big[path_idx] += pathapr;
  }
  }
  }
  /* find & keep best KEEP_MAX paths */
  for (i = 0; i < KEEP_MAX; i++) {
    bestpath = maxloc (p1_big, CORRS_START);
    p1_big[bestpath] = -BIG_VAL;
    pcorr_pre[i] = pcorr_big[bestpath];
    ph_pre[i] = ph_big[bestpath];
    ap_pre[i] = ap_big[bestpath];
  }
  /* CORRELATIONS FOR TRAILING THREE SYMBOLS */
  for (post_sym0 = 0; post_sym0 < CPMLEVELS; post_sym0++) {
    php2 = state_trans[0][post_sym0];
  for (post_sym1 = 0; post_sym1 < CPMLEVELS; post_sym1++) {
    php3 = state_trans[php2][post_sym1];
  for (post_sym2 = 0; post_sym2 < CPMLEVELS; post_sym2++) {
    path_idx = post_sym0*CPMLEVELS*CPMLEVELS +
    post_sym1*CPMLEVELS + post_sym2;
    pcorr = sym_corrs[corr_offset+1][post_sym0];
    Cpluseq_a_times_b (&pcorr,
                      sym_corrs[corr_offset+2][post_sym1],
                      rotations[php2] );
    Cpluseq_a_times_b (&pcorr,
                      sym_corrs[corr_offset+3][post_sym2],
                      rotations[php3] );
    pathapr =  sym_apr[corr_offset+1][post_sym0];
    pathapr += sym_apr[corr_offset+2][post_sym1];
    pathapr += sym_apr[corr_offset+3][post_sym2];
    pcorr_big[path_idx] = pcorr;
    ap_big[path_idx] = pathapr;
    p1_big[path_idx] = scale * Cabs2(pcorr);
    p1_big[path_idx] += pathapr;
  }
  }
  }
  for (i = 0; i < KEEP_MAX; i++) { /* find & keep best KEEP_MAX
paths */
    bestpath = maxloc (p1_big, CORRS_START);
    p1_big[bestpath] = -BIG_VAL;
    pcorr_post[i] = pcorr_big[bestpath];
    ap_post[i] = ap_big[bestpath];
  }
  /* COMBINE SAVED PRECEDING AND TRAILING CORRS WITH
  CORR FOR CURRENT SYMBOL */
  for (prepath = 0; prepath < KEEP_MAX; prepath++) {
    ph0 = ph_pre[prepath];
    for (curr_sym = 0; curr_sym < CPMLEVELS; curr_sym++) {
      php1 = state_trans[ph0][curr_sym];
      for (postpath = 0; postpath < KEEP_MAX; postpath++) {
        pcorr = pcorr_pre[prepath];
        Cpluseq_a_times_b (&pcorr,
                      sym_corrs[corr_offset][curr_sym],
                      rotations[ph0] );
        Cpluseq_a_times_b (&pcorr,
                      pcorr_post[postpath],
                      rotations[php1] );
        /* combine apriories */
        pathapr = ap_pre[prepath];
        pathapr += sym_apr[corr_offset   ][curr_sym ];
        pathapr += ap_post[postpath];
        /* compute path likelihoods */
        patharg = scale * Cabs2 ( pcorr );
        patharg += pathapr;
        sym11[curr_sym] = MAX(sym11[curr_sym], patharg);
      }
    }
  }
  for (i = CPMLEVELS-1; i >= 0; i--) {
    llr_out[i] = sym11[i] - sym11[0];
  }
}
```

-continued

APPENDIX

```
#undef KEEP_MAX
/**************************************************************/
/**************************************************************/
This requires the following self-explanatory functions and macros:
/**************************************************************/
/**************************************************************/
static void Cpluseq_a_times_b (dcomplex *c, dcomplex a, dcomplex b)
    /* complex c += a * b */
{
    (*c).r += (a.r * b.r) - (a.i * b.i);
    (*c).i += (a.r * b.i) + (a.i * b.r);
}
/**************************************************************/
/**************************************************************/
static double Cabs2 (dcomplex a)
    /* |a|^2  */
{
    return (a.r * a.r) + (a.i * a.i);
}
/**************************************************************/
/**************************************************************/
static int max_loc (double *in, int len) {
    /* find location of max element in array a */
    int i;
    int loc;
    double maxval;
    maxval = in[0];
    loc = 0;
    for (i = 1; i < len; i++) {
        if (in[i] > maxval) {
            maxval = in[i];
            loc = i;
        }
    }
    return loc;
}/**************************************************************/
/**************************************************************/
#define MAX(a,b)   ((a)>(b)  ?  (a)  :  (b))
Finally, a loop is needed to transverse the whole block:
/**************************************************************/
/**************************************************************/
void demod2s2 (dcomplex sym_corrs[ ][CPMLEVELS],
            long num_syms,
            double EsNo,
            double llr_sym[ ][CPMLEVELS],
            int interval_N1,
            int interval_N2,
            double sym_apr[ ][CPMLEVELS])
{
    long i;
    int j;
    double scale;
    /* assume that (zeroed) sym_corrs exist outside the given range +/-
        interval_N symbols */
    scale =  (2 * EsNo);
    if ((interval_N1 == 3) && (interval_N2 == 3)) {
        for (i = 0; i < num_syms; i++) {
            demod1s2_sym_N33 (sym_corrs, i, scale, llr_sym[i], sym_apr);
        }
    } else {
        fprintf(stderr, "Error in demod2s2 in %s\n" _FILE_);
        fprintf(stderr, "demod not implemented for N1 = %d and N2 = %d\n", interval_N1, interval_N2);
        abort( );
    }
}
#endif
/**************************************************************/
/**************************************************************/
```

What is claimed is:

1. A method of demodulating a received transmission, comprising:

breaking a symbol sequence into more than one symbol subsequence and a current symbol;

calculating sets of correlations for the subsequences based on possible phase transitions;

determining a top group of correlations from each set;

assembling all of the phase transitions in a final group, the final group comprising all of the possible combinations of transitions from the top groups for each possible value of the current symbol;

calculating correlations for each of the transition sequences of the final group; and determining the largest correlation for each possible value of the current symbol, the largest correlation used in demodulating the received transmission by a demodulator.

2. The method of claim 1, wherein the max likelihood is used for correlations.

3. The method of claim 1, further comprising:
determining the symbol sequence.

4. The method of claim 1, wherein the subsequences may comprise at least three subsequences.

5. The method of claim 1, wherein the subsequences comprise a before subsequence, a current symbol, and an after subsequence.

6. The method of claim 1, wherein the received transmission is a time division multiple access transmission.

7. A method of demodulating a received transmission, comprising:

disassembling a symbol sequence into a before sequence, a current symbol, and an after sequence;

calculating correlations for all possible before sequences;

determining the largest correlations for the before sequences, and placing into a first group;

calculating correlations for all possible after sequences;

determining the largest correlations for the after sequences, and placing into a second group;

piecing together the sequences of the first group, the second group and the current symbol, to form a third group;

calculating the correlations for the third group; and determining the largest correlation of the third group, the largest correlation used in demodulating the received transmission by a demodulator.

8. The method of claim 7, wherein max likelihood is used for correlations.

9. The method of claim 7, further comprising:
determining the symbol sequence corresponding to the largest correlation of the third group.

10. The method of claim 7, wherein the subsequence may comprise more than three subsequences.

11. The method of claim 7, wherein the subsequences comprise more than one before subsequence, more than one after subsequence.

12. The method of claim 7, wherein the received transmission is a time division multiple access transmission.

13. The method of claim 7, wherein the received transmission is an over-the-air transmission.

14. A system of demodulating a received transmission, comprising:

a demodulator configured to disassemble a symbol sequence into a before sequence, a current symbol, and an after sequence;

wherein the demodulator is further configured to calculate correlations for all possible before sequences;

wherein the demodulator is further configured to determine the largest correlations for the before sequences, and placing into a first group;

wherein the demodulator is further configured to calculate correlations for all possible after sequences;

wherein the demodulator is further configured to determine the largest correlations for the after sequences, and placing into a second group;

wherein the demodulator is further configured to piece together the sequences of the first group, the second group and the current symbol, to form a third group;

wherein the demodulator is further configured to calculate the correlations for the third group; and wherein the demodulator is further configured to determine the largest correlation of the third group, the largest correlation used in demodulation of the received transmission.

15. The system of claim 14, wherein max likelihood is used for correlations.

16. The system of claim 14, wherein the demodulator is further configured to determine the symbol sequence corresponding to the largest correlation of the third group.

17. The system of claim 14, wherein the subsequence may comprise more than three subsequences.

18. The system of claim 14, wherein the subsequences comprise more than one before subsequence, and more than one after subsequence.

19. The method of claim 14, wherein the received transmission is a time division multiple access transmission.

20. The method of claim 14, wherein the received transmission is an over-the-air transmission.

* * * * *